United States Patent Office 3,262,953
Patented July 26, 1966

3,262,953
METHOD OF PRODUCING POLYETHER POLYMERS FROM EPOXY-CONTAINING FATTY ACIDS OR ESTERS
Thomas W. Findley, La Grange, Ill., and John L. Ohlson, Bedford, Mass., assignors to Swift & Company, Chicago, Ill., a corporation of Illinois
No Drawing. Original application Apr. 10, 1957, Ser. No. 651,822, now Patent No. 3,035,069, dated May 15, 1962. Divided and this application Feb. 5, 1959, Ser. No. 791,265
3 Claims. (Cl. 260—407)

This application is a division of S.N. 651,822, filed April 10, 1957, now U.S. Patent No. 3,035,069.

This invention relates to new compositions of matter derived from epoxy fatty compounds. More particularly, the invention relates to compositions formed in the treatment of epoxy fatty materials with a catalytic amount of an acidic compound to open the epoxide ring.

An important object of this invention is to provide valuable new compositions derived from epoxy fatty compounds.

Another object is the provision of a method for preparing polymeric products from epoxy fatty compounds.

A further object is to provide a method for preparing substituted or unsubstituted alkoxy hydroxy fatty compositions, dihydroxy fatty compositions, and combinations and derivatives thereof.

Additional objects, if not specifically set forth herein, will be readily apparent to one skilled in the art from the following detailed description of the invention.

Generally, this invention contemplates the treatment of epoxy fatty compounds with acidic catalysts such as strong Lewis acids to destroy the epoxy configuration and form new compositions substituted or linked at the position in the molecule formerly occupied by the epoxide group. If the epoxy fatty compound alone is contacted with the catalyst, polymeric products are formed; whereas the treatment of the epoxy fatty compound with the catalyst in the presence of alcohol or water under the conditions set forth hereinafter results in the formation of alkoxy hydroxy fatty compositions, dihydroxy fatty compositions, and derivatives thereof.

More specifically, the invention relates to the polymerization of epoxy fatty compositions to form polyether fatty polymers and/or the selective alcoholysis or hydrolysis of said epoxy fatty compositions to produce fatty compounds having a hydroxy group and either an alkoxy or another hydroxy group on adjacent carbons in the aliphatic chain. By "adjacent" carbons is meant "next to" or on directly bonded carbons rather than merely in the vicinity of. The new compositions thus produced may be characterized by the following formula:

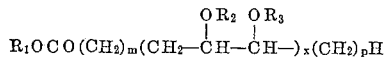

wherein $R_1$, $R_2$, and $R_3$ are members of the group consisting of H, alkyl, aryl, and fatty alkyl radicals which are at least trifunctional, at least two of the groups of said trifunctional fatty radical being present as a fatty glycol or a mono- or diether thereof and combinations thereof, with the proviso that at least one of $R_1$, $R_2$, and $R_3$ must be a trifunctional fatty radical as defined above; one of $R_2$ and $R_3$ must be H or a trifunctional fatty radical when the other is alkyl or aryl; $m$ and $p$ are whole numbers from zero to 15, $X=1-3$, and $$m+3X+p+1=10-22$$

SOLUBLE POLYETHER POLYMERS OF FATTY COMPOSITIONS

In one embodiment of the invention, linear polyethers are prepared by reacting fatty compositions having an oxirane content of about one per molecule with $BF_3$. The term "linear polyethers" is intended to include products in which the linkage between polymer chains is insufficient to render the product insoluble in organic solvents such as ethers, halogenated hydrocarbons, etc. While monoepoxides are preferred as the epoxy-containing components in this reaction, compositions having an oxirane content of more than one per molecule may be employed, provided the reaction is not carried to completion. The linear polymeric products may range from dimers to very high molecular weight polymers. They are characterized by a functional or reactive group upon each of the repeating ether groups from the polymer chain. The linear polymers have the following repeating structure:

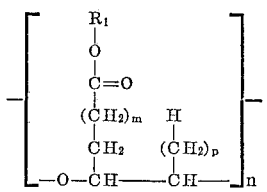

where $R_1$ is H, alkyl, substituted alkyl or aryl and mixtures thereof, $m$ and $p$ are numbers from 0 to 15; and $n$ is a positive whole number greater than one. The linear polymers may be prepared by simply admixing an epoxy fatty composition and $BF_3$-ether complex. An exothermic reaction ensues. The preferred method for the preparation of a particular polyether polymer depends upon the functional group present on the end of the chain. For esters of fatty acids and alcohols, the preferred method is to simply polymerize the epoxy esters. In the case of compositions containing relatively reactive functional groups such as acids, alcohols, aldehydes, etc., it is advisable to first replace the reactive portion with a more unreactive group prior to the polymerization reaction and subsequently reconvert to the desired more reactive functional group. Derivatives containing a functional group relatively inert to the epoxy group, such as nitriles, halides, ethers, amides, etc., can, like the esters, be polymerized directly.

The polymerization catalysts include borontrifluoride, borontrifluoride-ether complex, stannic chloride, zinc chloride, aluminum chloride, silicon tetrachloride, sulfuric acid, and perchloric acid. The preferred catalyst is borontrifluoride. The amount of catalyst required to effect polymerization will depend upon the type of epoxy fatty derivatives being treated, i.e., ester, acid, amide, and the particular catalyst being employed.

Epoxy fatty compositions which may be employed in producing the linear polyether polymers include preferably monoepoxy fatty acids, esters, amides, ethers, nitriles, alcohols and other functional derivatives thereof. Specific examples of monoethenoid acids from which the epoxy derivatives may be prepared for use herein are lauroleic (9,10 dodecenoic), myristoleic (9,10 tetradecenoic), palmitoleic (9,10 hexadecenoic), oleic (9,10 octadecenoic), petroselenic (6,7 octadecenoic), vaccenic (11, 12 octadecenoic), fadoleic (9,10 eicosenoic), erucic (13, 14 decosenoic), cetoleic (11, 12 docosenoic), 10,11 undecylenic and selacholeic (15,16 tetracosenoic) as well as acetyl ricinoleic acid. It is also possible to prepare linear polyether polymers of fatty materials containing more than a single epoxy group per molecule provided the reaction is partially modified to prevent cross-linking. Partial modification is achieved by adding a small amount of an alcohol or water to the catalyst as hereinafter described.

The linear polyether polymers of fatty acids and derivatives thereof are prepared as follows:

*Example I*

Molten 9, 10 epoxystearic acid at 60° C. was treated with 2 percent of commercial $BF_3$-ether complex. The exothermic reaction which ensued yielded a product which is a viscous oil at room temperature (Acid No. 130–140, 0.0% of oxirane oxygen). It is soluble in common organic solvents and in aqueous alkali. When the polymerization was carried out at about 90° C., the product had an acid number of 112.

The product is mainly the polyether polymer of 9,10 dihydroxystearic acid, although it is evident that some of the carboxyl group has reacted, since the acid number is low (theoretical is 188).

A pure polyoxystearic acid can be obtained by saponification of this product followed by urea refining, or by hydrolysis of the pure methyl ester prepared in Example II. In the preparation of the polyether fatty acids, strong Lewis acids are preferred as catalysts since selectivity of polyether formation is thereby insured with a minimum effect on other functional groups in the fatty acid molecule such as the carboxyl group. Sulfuric acid cannot be employed as the catalyst in this embodiment of the reaction because the use of this acid results in a reaction involving the carboxyl group to form polyesters. A non-selective procedure exemplary of this undesired polyester formation is reported by Swern et al., Journ. Am. Chem. Soc., 70 1228 (1948).

*Example II*

Methyl 9,10-epoxystearate (75% purity) was polymerized by addition of 2% by weight of commercial borontrifluoride etherate. The crude polyether polymer was a viscous liquid. It was purified by dissolving the crude polymer in a warm 20% solution of urea in methanol, allowing the solution to cool and filtering off the urea adducts of the remaining monomers. The pure polymer was washed free of urea and methanol and dried. It is the methyl ester of polyoxystearic acid, a viscous oil, soluble in mineral oil, with the property of improving the viscosity index and lubricity of the oil. These are valuable properties for lubricant additives.

The purification of the polymer can be carried out by other procedures, such as liquid-liquid extraction, propane refining, vacuum distillation, etc., as well as by the urea adduct formation described above.

*Example III*

It is possible, by following the above procedure and by carefully selecting the fatty material to be treated, to prepare a drying oil from a non-drying oil or a semi-drying oil. A partially epoxidized (1.36% oxirane oxygen) menhaden oil sample was polymerized with about 1% by weight of $BF_3$-etherate catalyst. The product, which was free of oxirane oxygen and exhibited an increased viscosity, could be air dried to give a smooth uniform film which is superior to that obtained by drying either unepoxidized menhaden oil or partially epoxidized unpolymerized menhaden oil. Treatment of a partially epoxidized soybean oil in a similar fashion results in a polyether polymer which also has sufficient unsaturation to exhibit air drying properties.

*Example IV*

The following epoxy fatty compounds have been polymerized by the addition of 0.5 to 2.0% by weight of the $BF_3$-etherate complex as the catalyst:

Butyl epoxystearate
Hexyl epoxystearate
Tetrahydrofurfuryl epoxystearate
Methyl esters of epoxidized soybean oil fatty acids
Epoxidized distilled acetylated monoglycerides of soybean oil
Epoxidized distilled acetylated monoglycerides of lard oil
Butyl esters of epoxidize soybean oil fatty acids
Isopropyl esters of epoxidized soybean oil fatty acids
Methyl cellosolve esters of epoxidized soybean oil fatty acids
2-ethyl hexyl esters of epoxidized soybean oil fatty acids These polymeric products which are soluble in most of the common organic solvents are viscous oils which are compatible with mineral oil and possess the properties of decreasing the temperature coefficient of the viscosity of the oil and improving lubricity. The utility of these compositions as additives for lubricating oils is therefore apparent.

By saponfication of the linear polymeric fatty acids and esters described above, valuable salts of polyether fatty acids may be produced. The sodium, potassium, and ammonium salts of these polyether fatty acids are water soluble and surface active and find use where such water soluble surfactants are desirable.

INSOLUBLE INFUSIBLE POLYMERS

In another embodiment of this invention a three dimensional cross-linked polymer is formed by reacting fatty compositions containing in excess of one epoxy group per molecule with the acidic catalyst. Epoxidized polyunsaturated fatty materials such as epoxidized soybean oil, for example, may be treated with $BF_3$ or sulphuric acid to produce a high molecular weight clear solid having a substantial resistance to melting and substantial resistance to solvent action. The insoluble infusible polymers are cross-linked through ether linkage on the fatty chain. These polymers can also be considered as polyether fatty acids cross-linked by esterification of carboxyl groups with a polyhydric alcohol. In the case of monohydric alcohol esters of polyepoxy fatty acids, however, cross-linked polymers are achieved solely through the multiple ether groups on the chain.

These compositions may be prepared from monomers in accordance with the following equation to form the cross-linked products II.

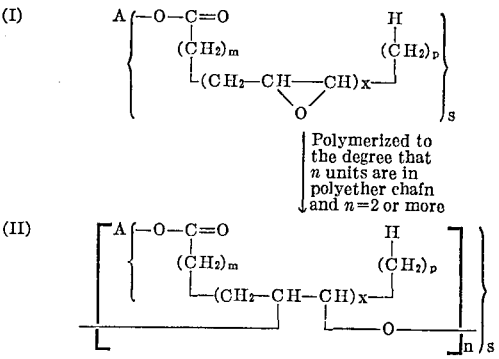

Where:
$X=1-3$ and is the number of epoxy groups per fatty chain.
$s=1-8$ and is the number of fatty chains per molecule.
$A$ is an alkyl radical with a valence S.
$p$ and $m$ are numbers from 0 to 15 and $$m+3X+p+1=10-22$$

In order that the polymer be cross-linked, the quantity $n(Xs)$ must be greater than $n+Xs$.

The cross-linked polymers of epoxy fatty materials are useful in the casting and molding of plastics and as additives and ingredients in natural and synthetic rubbers. The elastic transparent solids are substantially insoluble in organic solvents and aqueous alkali and, in addition, exhibit an improved resistance to melting when exposed to high temperatures. These polymers also possess a high degree of flexibility not ordinarily found in cross-linked polymers.

Cross-linked polymers which are included within the scope of this invention are those polymers formed from the epoxy fatty esters of polyhydric alcohols such as glycols and glycerine and aliphatic epoxy acids containing from 10 to 22 carbon atoms and functional derivatives thereof, in which esters the number of epoxy groups exceeds an average of one per molecule. In addition, other oleaginous compositions containing an average of more than one epoxy group per molecule may be employed in the cross-linking process. Naturally occurring triglycerides coming within the scope of the invention are those triglycerides having sufficient unsaturation in the fatty acid chain to provide upon epoxidation an average of more than one epoxy group per molecule. The drying and semi-drying oils such as soybean, oil, linseed oil, perilla oil, rapeseed oil, and fish oils are illustrative of this group. Sperm oil and lard oil are examples of other applicable oils. These oils may be epoxidized by any of the known methods for epoxidizing fatty materials using percarboxylic acids.

In carrying out the cross-linking reaction, it is advisable to modify the action of the catalyst by complex formation. If stannic chloride or $BF_3$, for example, is added directly to the epoxy containing composition, local solidification occurs, and a coating of the polymer is formed around the catalyst particles. This, of course, results in a decrease of available catalyst, thus minimizing further catalyst activity. Modification of the catalyst by forming a complex is effected by reaction of the Lewis Acid with a Lewis Base such as water, alcohols, ethers, etc. Specific examples of such compositions are methanol, isopropanol, n-butanol, Methyl Cellosolve and polyglycols such as tetraethylene glycol. With the $BF_3$-ether complex excess ether may be required. Such a procedure prevents encasement of the catalyst by the polymer and insures completion of the reaction without the necessity for using a wasteful excess of catalyst. When $BF_3$ is employed as the catalyst, ethers are particularly useful as a solvent since they form a complex with the $BF_3$ and decrease the effective concentration of the catalyst in the mixture. This latter feature insures a smooth and more easily controlled reaction. The following examples illustrate the preparation of the cross-linked polymers.

Example V

To 100 grams of epoxidized soybean oil (6.2% epoxy oxygen) was added 10 ml. of Methyl Cellosolve (2-methoxyethanol) containing 1 ml. of borontrifluoride-ether complex. The mixture was stirred vigorously. Solidification took place after about 19 seconds, the temperature having risen to about 120° C. The product is a light yellow transparent solid with high elasticity. It may be ground to give a powder of high absorptive capacity, however.

Example VI

An ether solution of concentrated sulphuric acid (about 0.1 grams $H_2SO_4$ in 10 ml. of ether) was added to a 10 gram sample of epoxidized soybean oil. After thoroughly mixing the acid solution in the epoxidized oil, the reaction mixture was placed on a steam bath to evaporate the ether. The mixture was held on the steam bath at about 95° C. for 70 hours. At the end of this time, a clear solid had formed which was insoluble in aqueous alkali and organic solvents.

Example VII 100 grams of epoxidized sperm oil (oxirane oxygen=3.85) is mixed with 2 grams of a water solution of $BF_3$-$H_2O$ complex. The water complex is prepared by treating commercially available $BF_3$-etherate complex with water to displace the ether radical from the complex. The mixture is stirred vigorously and an exothermic reaction takes place, raising the temperature of the reaction mixture markedly. When the reaction has ceased, the mixture is set up to form a tacky mass dimensional stability.

Example VIII 2 grams of a water solution of a $BF_3$-$H_2O$ complex and 100 grams of epoxidized glyceryl trioleate (oxirane oxygen=4.4%) were admixed and the mixture stirred vigorously until an exothermic reaction had begun. As the temperature rose, stirring was halted and the reaction was allowed to proceed to completion. The reaction product was a non-tacky, cross-linked solid having moderately pliable characteristics.

Example IX

A sample of epoxidized lard oil (100 grams) having an epoxy oxygen content=3.98% was added to 10 ml. of Methyl Cellosolve containing 1 gram of $BF_3$-etherate complex. The reaction proceeded in substantially the same fashion as with the cross-linking of epoxidized soybean oil (see Example V above), with the exception that the epoxidized lard oil reacts somewhat less vigorously, the temperature increases to about 80° C. and solidification requires about one minute. The product is a friable solid of a consistency comparable to a lead pencil eraser.

Example X 100 grams of epoxidized linseed oil (oxirane oxygen=8.2%) was mixed with 10 ml. tetraethylene glycol monomethyl ether containing 1 ml. $BF_3$-etherate. The mixture was stirred and within a matter of seconds a vigorous exothermic reaction occurred. After the reaction mixture had cooled to about room temperature, a hard, transparent solid was obtained.

Example XI 10 grams of partially epoxidized menhaden oil (3.8% oxirane oxygen) was mixed with 0.2 ml. $BF_3$-etherate complex dissolved in 4 ml. ether, and the mixture was stirred vigorously. The temperature rose spontaneously and when the reaction had subsided, a tacky, rubbery insoluble polymer remained.

It is also possible to produce salts of the linear polymers such as those linear polymers described previously from cross-linked products by saponification of the cross-linked polymer. The soaps of polyether polybasic acids which are formed are useful as surface-active agents. Acidification of the soap product results in the production of polyether polymers of oxy fatty acids. Two examples of the preparation of these poly soaps and polymers derived by acidification of the poly soaps follow:

Example XII

The solid cross-linked polyether polymer obtained in Example V above was saponified by refluxing this polymer with 0.5 N alcoholic KOH for 1 hour. The saponified mixture after cooling was poured into a dilute aqueous hydrochloric acid solution. The oil which separated was removed from the mixture and dried. This very viscous oil consists of a polyether polymer of stearic acids wherein $C_{18}$ chains are joined to each other through oxygen atoms at the 9, 10, 12, or 13 positions.

Example XIII

A solid infusible cross-linked polymer prepared from epoxidized rapeseed oil was saponified in the manner set forth in the preceding example. In this instance, the polymer is made up primarily of $C_{22}$ fatty acid chains mutually joined at the 13 and/or 14 position and substituted through an ether link with $C_{18}$ fatty acid chains, the latter substituted mainly at the 9 and/or 10 position.

Example XIV

The viscous oil obtained by saponification in the foregoing manner of a cross-linked polymer derived from epoxidized sperm oil is a polyhydroxy polybasic acid.

The fatty chains which have a chain length of about 12 to 18 carbon atoms and which contain terminal carboxyl or hydroxyl groups are joined through an ether linkage primarily at the 9 or 10 position.

Soluble polysoaps of epoxidized lard oil, epoxidized olive oil, epoxidized peanut oil, epoxidized cottonseed oil, epoxidized safflower seed oil, and epoxidized linseed oil have been prepared in accordance with the method set forth in Examples XII, XIII, and XIV.

SELECTIVE ALCOHOLYSIS OR HYDROLYSIS

A further modification of this invention is the treatment of epoxy fatty compounds with acidic catalysts in the presence of an appreciable amount of alcohol or water to produce alkoxy hydroxy or dihydroxy fatty esters. As has been noted previously, it is desirable to have a small amount of a primary alcohol or water present in the preparation of the polymeric products in order to moderate catalyst activity. However, it is possible to form soluble polymers from polyepoxides if the amount of alcohol or water employed is kept within limits. The molar ratio of alcohol to oxirane oxygen should be less than about one, but should be greater than the value for $n-1/n$ where $n$ is the number of epoxy groups in the epoxy fatty compound.

In the preparation of cross-linked products, this molar ratio should not be greater than the value for $n-1/n$ when $n$ represents the number of epoxy groups per molecule in the epoxy fatty compound. The linear and cross-linked polyethers produced from polyepoxides in this manner also contain alkoxy and hydroxy groups on adjacent carbons in one of the fatty radicals of the ester. The number of alkoxy-hydroxy groups formed is determined by the quantity of alcohol added. The production of the non-polymeric alkoxy-hydroxy or dihydroxy derivatives, however, requires that an excess of the alcohol or water be present in an amount greater than 1 mol ROH/mol epoxy group.

More specifically, the production of the alkoxy-hydroxy or dihydroxy derivatives by the selective alcoholysis or hydrolysis of epoxidized oils contemplates an exothermic reaction between an epoxidized oil and a strong Lewis acid catalyst such as $SnCl_4$ or $BF_3$ and a molar excess of an alcohol or water. An interesting observation on this reaction is its selective nature in that the reaction takes place primarily at the epoxide group with little or no effect on the ester linkage. The excess of alcohol or water appears to be necessary to avoid polymerization of the oil and to insure that the desired compositions are formed. It has been found that larger excesses are required where secondary or tertiary rather than primary alcohols are employed. The products are viscous oils for the most part, but, in some cases, may be low melting solids. These products are useful as additives for lubricating oils, greases, and as intermediates in the preparation of polyurethane resins. The selectivity noted above is insured if strong Lewis acids are used as catalysts. Sulfuric acid is not a satisfactory catalyst in the method for producing alkoxy-hydroxy and dihydroxy fatty esters since this results in a reaction at the ester group in the molecule to form products similar to those of Swern et al. Patent No. 2,542,062. Moreover, this results in the formation of fatty esters of monohydric alcohols as distinguished from the glycerides. Even where strong Lewis acids are employed, extended periods of refluxing of the reaction mixture containing the catalyst are not required and should, in fact, be avoided since this also results in ester interchange at the ester group.

Epoxy containing materials which may be employed in the selective alcoholysis or hydrolysis reaction include, in general, epoxidized fatty materials such as those mentioned previously in the production of linear polymers and also those applicable in the preparation of cross-linked polymers. The following examples are illustrative of the method by which the selective alcoholysis or hydrolysis may be carried out:

Example XV

To 1 part of epoxidized soybean oil and 2 parts of methanol about 0.5% to 1% of borontrifluoride etherate complex were added, and an immediate exothermic reaction ensued. After the reaction mixture had cooled to room temperature, the product was washed with water to remove the excess of reactants. After drying, the reaction product had a saponification number of 167.4 and was primarily the mixed triglycerides of hydroxymethoxystearic and dihydroxydimethoxystearic acid.

Example XVI

To 1 part of epoxidized lard oil (Sap No. 181) and 2 parts of secondary butyl alcohol about 0.5% to 1% of borontrifluoride etherate complex was added. The typical exothermic reaction resulted and was permitted to proceed until the reaction mixture had cooled to room temperature. After washing and drying of the product, the acid number was 1.5 and the saponification number was 179.2. No epoxy oxygen was noted in an oxirane analysis run on the product.

Example XVII

Epoxidized menhaden oil was treated in accordance with the method set forth in Example XVI. The alkoxy-hydroxy glyceride which resulted had an acid number of 2.6 and a saponification number of 167.0.

Epoxidized soybean oil was treated in the aforementioned manner with the following alcohols:

| Alcohol: | Description of product |
| --- | --- |
| Isopropanol | Light viscous oil. |
| Tallow alcohol | Low melting solid. |
| Oleyl alcohol | Viscous oil. |
| Allyl alcohol | Viscous oil. |
| Benzyl alcohol | Viscous oil. |
| Butyl cellosolve | Viscous oil. |

Oxirane oxygen of the above products was negligible.

The following example shows the preparation of a glyceride having a glycol configuration in the fatty acid portion of the molecule.

Example XVIII 200 grams of epoxidized soybean oil (Sap No.=182) was mixed with 50 grams of water and 10 grams $BF_3$-etherate complex. About 100 ml. dioxane was added to the mixture to increase the homogeneity thereof. The mixture was stirred and heated to about 60° C. on the steam bath to start the reaction. The temperature rose to about 75° C. and the turbidity resulting from immiscibility of the reactants was dispelled. The reaction was held at about 75° C. by the dropwise addition of 5 ml. of water over a period of about 8 to 10 minutes. The water addition serves to modify the reaction. After holding the mixture at this temperature for about one-half hour, 300 ml. of water is added, causing separation into two phases. The upper oily layer is extracted with 500 ml. of ether and washed with water several times to remove any excess $BF_3$ complex. The ether extract is dried over sodium sulfate overnight and then decanted from the solid sodium sulfate and filtered. After removal of the ether by distillation, a highly viscous yellow liquid having a Sap No.=167.8 remains. The decrease in the saponification number from that of the epoxidized soybean oil treated shows the increase in molecular weight effected by the formation of a glycol from the oxirane ring. The product also gives a positive test when treated with toluene di-isocyanate. The di-isocyanate test involves treating 5 grams of the product with about 1.5 grams of toluene di-isocyanate. When about 1% aqueous pyridine is added to this mixture, an exothermic polymerization reaction takes place. Such a reaction does not proceed when epoxidized materials are treated under similar conditions.

It is possible, by treating oils such as soybean oil and linseed oil, to prepare glycerides having 9, 10, 12, 13 tetrahydroxy substituents as well as 9, 10 dihydroxy substituted acid radicals in the acid portions of the molecule.

It is thus apparent that epoxidized fatty compounds may be treated with acid catalysts in either the presence of an alcohol or water to produce a variety of valuable products. The type of product produced is determined by control of the following variables:

(1) Average oxirane content of the epoxidized fatty material treated;

(2) The quantity of solvent or complexing agent employed; and (3) The activity of the catalyst.

Obviously, many modifications and variations of the invention as hereinbefore set forth may be made without departing from the spirit and scope thereof, and, therefore, only such limitations should be imposed as are indicated in the appended claims.

We claim:

1. A method of producing polyether polymers from epoxy-containing fatty materials, said materials being selected from the group consisting of epoxidized fatty acids and esters, which comprises: contacting said epoxy-containing material with a catalytic amount of a strong Lewis acid catalyst in the presence of an amount of solvent sufficient to provide a molar ratio of solvent to oxirane oxygen of less than 1, said solvent being of the formula ROH wherein R is selected from the group consisting of hydrogen, alkyl, alkoxy alkyl, and benzyl to selectively break the epoxy configuration of said epoxy-containing material and leave other functional groups of said material unaffected.

2. The method of claim 1, wherein the molar ratio of solvent to oxirane oxygen is less than about one but greater than $n-1/n$ where $n$ is the number of oxirane groups in the fatty material.

3. The method of claim 1, wherein the molar ratio of solvent to oxirane oxygen is not greater than $n-1/n$ where $n$ is the number of oxirane groups in the fatty material.

References Cited by the Examiner
UNITED STATES PATENTS 2,455,912 12/1948 Cairns et al.
3,035,069 3/1962 Findley et al. _____ 260—398

CHARLES B. PARKER, *Primary Examiner.*

ABRAHAM WINKELSTEIN, *Examiner.*

D. D. HORWITZ, A. H. SUTTO, *Assistant Examiners.*